(12) United States Patent
Sakamoto et al.

(10) Patent No.: US 6,507,382 B1
(45) Date of Patent: Jan. 14, 2003

(54) LIQUID-CRYSTAL DISPLAY

(75) Inventors: Michiaki Sakamoto, Tokyo (JP); Mamoru Okamoto, Tokyo (JP); Shinichi Nakata, Tokyo (JP); Yuji Yamamoto, Tokyo (JP); Takahiko Watanabe, Tokyo (JP); Hirofumi Ihara, Tokyo (JP); Hironori Kikkawa, Tokyo (JP); Hiroaki Matsuyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/538,907

(22) Filed: Mar. 30, 2000

(30) Foreign Application Priority Data

Apr. 6, 1999 (JP) .............................. 11-099150

(51) Int. Cl.⁷ ..................... G02F 1/139; G02F 1/1368
(52) U.S. Cl. ..................... 349/141; 349/106; 349/130; 349/139
(58) Field of Search .................. 349/43, 141, 106, 349/139, 130, 132; 345/88, 92

(56) References Cited

U.S. PATENT DOCUMENTS

| | | | | |
|---|---|---|---|---|
| 5,943,107 A | * | 8/1999 | Kadota et al. | 349/141 |
| 6,040,886 A | * | 3/2000 | Ohta et al. | 349/141 |
| 6,233,034 B1 | * | 5/2001 | Lee et al. | 349/141 |
| 6,236,441 B1 | * | 5/2001 | Aratani et al. | 349/141 |
| 6,281,956 B1 | * | 8/2001 | Ohmuro et al. | 349/141 |

FOREIGN PATENT DOCUMENTS

| | | | | |
|---|---|---|---|---|
| JP | 01-265231 | 10/1989 | ........... | G02F/1/133 |
| JP | 4-261552 | 9/1992 | ........... | G03G/15/00 |
| JP | 5-505247 | 8/1993 | ........... | G02F/1/137 |
| JP | 6-43461 | 2/1994 | ......... | G02F/1/1337 |
| JP | 10-186351 | 7/1998 | ......... | G02F/1/1335 |

OTHER PUBLICATIONS

Soref, R.A., Field effects in nematic liquid crystals obtained with interdigital electrodes, Journal of Applied Physics, vol. 45, No. 12, Dec. 1974, pp 5466–5468.

* cited by examiner

*Primary Examiner*—William L. Sikes
*Assistant Examiner*—Tai Duong
(74) *Attorney, Agent, or Firm*—Hayes Soloway PC

(57) ABSTRACT

This invention provides a liquid-crystal display where both pixel electrode 14 and common electrode 3 for controlling a liquid-crystal layer 40 are disposed above a color filter 10 covered with a shield electrode 20.

8 Claims, 5 Drawing Sheets

LIQUID-CRYSTAL DISPLAY

BACKGROUND OF THE INVENTION

1. Field of the Invention

This invention relates to an active matrix type of liquid-crystal display where thin film transistors (TFTS) arranged in a matrix form are used as switching elements.

2. Description of the Related Art

An active matrix type of TFT liquid-crystal display using TFTs as switching elements has been utilized as a high-quality flat display in a wide variety of applications. In a conventional TFT liquid-crystal display, a liquid-crystal layer is driven by applying an electric field vertical to a substrate between electrodes sandwiching the liquid-crystal layer, typically in a twisted nematic display.

This type of TFT liquid-crystal display, however, has a relatively narrower angle of visibility and a poor contrast, resulting in a whitish screen and a narrow angle of visibility. Thus, there is room for improvement.

JP-As 4-261552 and 6-43461 have suggested techniques for improving visual-angle properties of a liquid-crystal display. In these techniques, a homeotropically oriented liquid-crystal cell is prepared; the cell is sandwiched between two polarizing plates whose polarization axes are perpendicular to each other; a common electrode having an opening is used to generate an oblique electric field in each pixel for dividing each pixel into two or more liquid-crystal domains and thus improving the visual-angle properties. In particular, in JP-A 4-261552, a high contrast can be achieved by controlling a tilting direction of the liquid-crystal during voltage application. In a technique described in JP-A 6-43461, an optical compensator is used as appropriate, to improve visual-angle properties in black. In addition, in JP-A 6-43461, each pixel is divided into two or more domains with an oblique electric field not only in a homeotropically oriented liquid-crystal cell but also in a TN oriented cell, to improve visual-angle properties.

JP-A 5-505247 has suggested an IPS (In-Plane Switching) mode of liquid-crystal display where both of two electrodes are formed on one substrate for allowing a crystal molecule to be rotated while being parallel to the substrate and a voltage is applied between the electrodes to generate an electric field parallel to the substrate. In this type of display, the longitudinal axis of the crystal molecules does not rise in relation to the substrate when applying a voltage. Thus, change in a birefringence of the liquid crystal is small when changing a line of sight, and therefore a wide angle of visibility can be achieved.

There will be described an active matrix type of TFT liquid-crystal display employing an IPS mode where both of two electrodes are formed on one substrate as described above.

FIGS. 5(a)–5(b) show a conventional TFT liquid employing an IPS mode, where FIG. 5(a) is a cross section taken on line A–A' in FIG. 5(b).

In FIG. 5(a), a gate electrode 502 made of Cr and a common electrode 503 are formed on a glass substrate 501, and a gate insulating film 504 made of silicon nitride is formed, covering these electrodes.

On the gate electrode 502, there is formed a semiconductor film 505 made of amorphous silicon acting as an active layer for a transistor, via the gate insulating film 504. A drain electrode 506 made of molybdenum and a source electrode 507 are superposed on a part of the pattern of the semiconductor film 505, and a protective film 508 made of silicon nitride is formed over all of the elements.

In FIG. 5(b), a region for one pixel is disposed between the source electrode 507 and the extracted common electrode 503.

There is formed an oriented film OR11 which has been rubbed, on the active matrix substrate in which unit pixels constructed as described above are arranged in a matrix form.

On the other hand, a color filter 532 delimited by a shield 533, and a protective film 534 is formed over these elements. Again, an oriented film OR12 which has been rubbed is formed on the protective film 534.

The glass substrate 501 and the opposed substrate 531 are disposed in a manner that their oriented films OR11 and OR12 face to each other, with a space which is filled with a liquid-crystal composition 540. Polarizing plates are formed on the outer faces of the glass substrate 501 and the opposed substrate 531. The shield 533 dividing the color filter 532 is formed such that a part of the shield is superposed over a thin film transistor consisting of the semiconductor film 505.

In a TFT liquid-crystal display constructed as described above, crystal molecules 541a are substantially parallel to the extended electrode direction when an electric field is not applied to the crystal composition 540. Specifically, the liquid-crystal molecules 541a are oriented such that the longitudinal (optical axis) direction of the liquid-crystal molecules 541a forms an angle of at least 45° to less than 90° to the direction of the electric field generated between the source electrode 507 and the extracted common electrode 503. The mutually facing glass substrate 501 and opposed substrate 531 are parallel to the liquid-crystal molecules. The dielectric anisotropy of the liquid-crystal molecules 541a herein is positive.

On turning on the thin film transistor (TFT) by applying a voltage to the gate electrode 502, a voltage is applied to the source electrode 507 and then an electric field is induced between the source electrode 507 and the opposed common electrode 503. The electric field then changes the direction of the liquid-crystal molecules from 541a to 541b. The liquid-crystal molecules 541b are substantially parallel to the direction of the electric field generated between the source electrode 507 and the opposed common electrode 503.

Since the molecular axis of the liquid-crystal molecules are controlled as described above in an IPS mode, the polarized-light transmitting axis of the polarizing plate 551 may be set at a given angle to change a light transmittance.

As described above, an IPS mode of TFT liquid-crystal display may provide a contrast without a transparent electrode. Furthermore, the longitudinal axis of the liquid-crystal molecules is substantially parallel to the substrate face in the above IPS mode of TFT liquid-crystal display, and therefore, does not rise by voltage application. Thus, in such a display, there may occur a small change in brightness when changing a visual angle, and visual properties may be improved.

Journal of Applied Physics, Vol. 45, No. 12, p.5466 (1974) and JP-A 10-186351 have disclosed, besides the above IPS mode, a mode where a liquid-crystal having a positive dielectric anisotropy is homeotropically oriented to a vertical direction to a substrate and the liquid-crystal molecules are oriented to a direction parallel to the substrate by an electric field parallel to the substrate, where the homeotropically oriented liquid-crystal molecules are divided into two or more regions whose tilting angles are different from each other, due to the direction of the electric field.

However, since a color filter is disposed between a layer on which liquid crystal is placed and an opposed substrate in the above prior art, an electric field generated by applying a voltage between a source electrode and a common electrode affects a color filter, leading to deterioration of display properties for the TFT liquid-crystal display. Pigments in a color filter contain impurities such as sodium ions, causing charging of the color filter when applying an electric field to the filter. The opposed substrate is made of an insulating material. Therefore, when the color is charged, an unwanted electric field may remain in the liquid-crystal under the charged region, which adversely affects the display properties.

To solve the problem, a color filter might be formed on the substrate comprising TFTs (hereinafter, referred to as a "TFT substrate") instead on the opposed substrate. There are a variety of interconnecting layers on the TFT substrate. Such a configuration might, therefore, prevent charging of the color filter and reduce effects of accumulated charge in the color filter on the liquid-crystal layer. In addition, the color filter and TFTs formed on the same substrate may make misalignment less frequent in comparison with those formed on separate substrates, allowing a high-definition liquid-crystal display to be favorably fabricated.

However, as there has been increasingly higher level of needs for a high-performance device, it has been needed to eliminate an unwanted electric field to a liquid-crystal layer to a higher level compared to the prior art. For example, for forming a color filter on a TFT substrate, it is necessary to reduce a distance between the color filter and the liquid-crystal layer because of requirements to, e.g., a finer liquid-crystal display. In such a case, a small amount of charge accumulated in the color filter may significantly affect the liquid-crystal layer. In other words, only forming the color filter on the TFT substrate has not been sufficient to meet needs for eliminating an unwanted electric field to a higher level.

Forming a color filter on a TFT substrate is, to some extent, effective for eliminating effects of an unwanted electric field because a pixel electrode and a common electrode which generate an electric field for driving the liquid-crystal are formed on the color filter and thus an unwanted electric field due to charging or charging-up of the color filter is absorbed by the pixel and the common electrodes instead leaking to the liquid-crystal layer. However, attempting to eliminate an unwanted electric field to a higher level, an intense electric field due to scanning and/or signal lines may cause significant charging-up or charging of the color filter, and the electric field may be inadequately absorbed by the electrodes and leak to the liquid-crystal layer. It is, therefore, important to solve the problem. Such charging may deteriorate display properties; for example, uneven coloring may occur in a multicolor liquid-crystal display. Such a problem has become significant by disposing a color-filter on a TFT substrate. It has not been, therefore, recognized in the prior art and there are few investigations for the problem.

SUMMARY OF THE INVENTION

In light of the above situation, an objective of this invention is to prevent charging of a color filter due to, for example, an electric field between interconnections and to reduce effects of accumulated charge in the color filter on a liquid-crystal layer in a liquid-crystal display where the color filter is formed on a TFT substrate. Thus, another objective of this invention is to improve display properties of the liquid-crystal display and in particular to prevent uneven coloring in a multicolor liquid-crystal display.

To solve the above problems, this invention provides a liquid-crystal display comprising the first and the second substrates and a liquid-crystal layer between the substrates, wherein a pixel consisting of a pixel electrode and a common electrode in a matrix form and a switching element for controlling operation of the pixel are formed on the liquid-crystal-layer side of the first substrate and a color filter and a shield electrode covering the color filter are formed on the first substrate and the pixel electrode and the common electrode are formed on the shield electrode.

This invention also provides a liquid-crystal display comprising the first and the second substrates and a liquid-crystal layer between the substrates, wherein a pixel consisting of a pixel electrode and a common electrode in a matrix form and a switching element for controlling operation of the pixel are formed on the liquid-crystal-layer side of the first substrate and a color filter is formed on the first substrate and the common electrode is formed covering the color filter.

In a liquid-crystal display of this invention, a color filter is formed on the first substrate and a shield or common electrode covers the color filter. In other words, there are the color filter and the shield or common electrode covering the color filter between the first substrate and the pixel and the common electrodes. Such a structure may allow the color filter to be protected from an electric field generated between interconnections, in particular between the pixel and the common electrodes, and may prevent the color filter from being charged due to these electric fields. There is disposed the shield or common electrode between the color filter and the liquid-crystal layer, which may reduce effects of accumulated charge in the color filter on the liquid-crystal layer. Therefore, according to this invention, display properties of a liquid-crystal display can be improved and uneven coloring can be effectively prevented in a multicolor liquid-crystal display.

DETAILED DESCRIPTION OF THE PREFERRED EMBODIMENTS

Figure 1A:
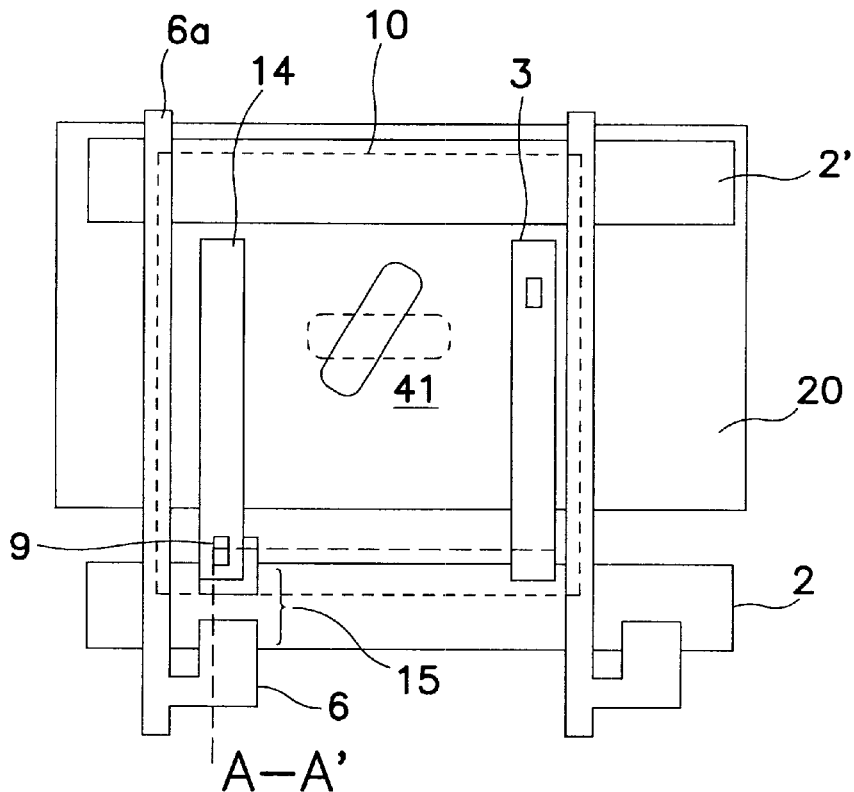
FIGS. 1(a) and 1(b) show a plan view and a cross sectional view illustrating the configuration of a liquid-crystal display according to Embodiment 1 of this invention.

In a liquid-crystal display according to this invention, a shield electrode is formed covering a color filter or a common electrode covers the color filter. As used herein, the term "cover" means that the color filter is substantially completely or partially covered. It is preferable to cover a region surrounded by electrodes controlling a liquid-crystal orientation (referred to as an "electrode-pair region") in the color filter. An electrode controlling a liquid-crystal orientation herein refers to a pixel or common electrode. An electrode-pair region is, for example, a region surrounded by a pixel electrode 14 and a common electrode 3 in FIGS. 1(a)–1(b). As shown in FIGS. 1(a)/(b) and FIGS. 3(a)/(b)–5(a)/(b), substantially completely covering the color filter in the electrode-pair region may prevent the color filter from being charged and reduce effects of accumulated charge in the color filter on the liquid-crystal layer.

In this invention, the shield or common electrode covers preferably at least 60%, more preferably at least 70% of the color filter. It may more effectively reduce charging of the color filter or effects of accumulated charge in the color filter on the liquid-crystal layer. Furthermore, the shield or common electrode covers preferably at least 70%, more preferably at least 80% of the electrode-pair region. It may much more effectively prevent charging of the color filter or reduce effects of accumulated charge in the color filter on the liquid-crystal layer.

In this invention, it is preferable to dispose at least a part of the common electrode between the pixel electrode and the color filter. It is particularly preferable to form a pixel electrode on the common electrode, i.e., to sequentially form a color filter, a common electrode and a pixel electrode on the first substrate. It may further minimize effects of an electric field generated between the pixel and the common electrodes on the color filter, and prevent charging of the color filter. Furthermore, it may allow the area of the common electrode to be increased while preventing it from being in contact with the pixel electrode and may allow the color filter to be effectively shielded from the pixel electrode. For example, if a pixel electrode and a common electrode are formed on the same substrate, the common electrode may not be very wide because of current leak due to its contact with the pixel electrode. On the other hand, the above structure may solve the problem. In addition, in the above structure, a storage capacity may be provided between the pixel electrode and the common electrode to improve the layout efficiency of the device, which is advantageous for, e.g., achieving a higher definition.

The shield electrode in this invention contributes to protecting the color filter from an electric field between other interconnections and shielding the color filter as described above. The shield electrode may have the same potential as the pixel or common electrode.

The shield electrode is preferably made of a transparent and conductive material such as ITO. In the structure where the common electrode covers the color filter, the common electrode may be made of ITO as is above.

In this invention, the common electrode and the pixel electrode are formed on the same substrate. It is preferable to generate an electric field dominantly containing a component parallel to the first substrate (an electric field mainly containing a parallel component) by a voltage applied between the common electrode and the pixel electrode. Generating such an electric field may further improve visual properties.

In this invention, liquid-crystal molecules may be oriented to a direction substantially parallel or vertical to the first substrate without voltage application, i.e., when no voltage is applied between the common electrode and the pixel electrode.

Some embodiments of this invention will be specifically described.

Embodiment 1

Figure 1B:
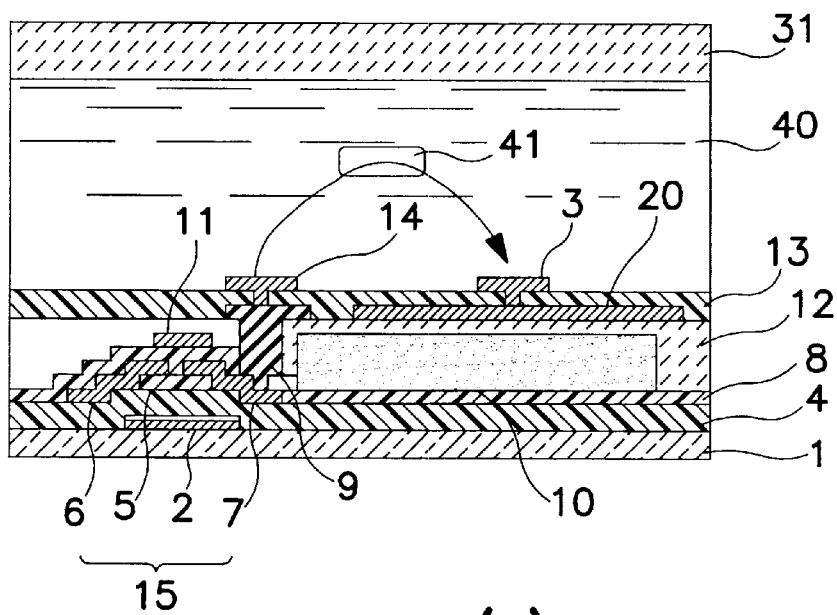

The structure of the liquid-crystal display of this embodiment will be described with reference to FIGS. 1(a)–1(b), where FIG. 1(b) is a cross section taken on line A–A' in FIG. 1(a).

In the liquid-crystal display of this embodiment, as illustrated in FIG. 1(b), a gate electrode (scanning signal electrode) 2 made of Cr and a gate insulating film 4 made of silicon nitride covering the gate electrode 2 are formed on a glass substrate 1.

On the gate electrode 2, there is formed a semiconductor film 5 made of amorphous silicon acting as an active layer for a thin layer transistor (TFT), via the gate insulating film 4. A drain electrode 6 made of molybdenum and a source electrode 7 are superposed on a part of the pattern of the semiconductor film 5, and a protective film 8 made of silicon nitride is formed over all of the elements. As shown in FIG. 1(a), the drain electrode 6 is connected to a data line (an image signal electrode) 6a. In other words, the drain electrode 6 is formed as a part of the data line 6a.

On the glass substrate 1, a color filter 10 is formed via a protective film 8 and on the color filter, there are sequentially deposited an overcoat layer 12, a shield electrode 20 and an interlayer film 13. The shield electrode 20 covers at least a part of the color filter 10. In this embodiment, viewing the display from the top side as illustrated in FIG. 1(a), the shield electrode 20 covers at least 75% of the color filter area and at least 90% of the electrode-pair region (the region surrounded by a pixel electrode). The area of the color filter 10 is indicated with a dotted line in FIG. 1(a).

On the interlayer film 13, the pixel electrode 14 and a common electrode 3 are separately formed. The pixel electrode 14 is connected to the source electrode 7 via a contact plug 9. The area surrounded by the pixel electrode 14 and the common electrode 3 constitutes one pixel pair. The molecular axis of liquid-crystal molecules 41 in a liquid-crystal layer 40 is controlled by an electric field generated between the pixel electrode 14 and the common electrode 3.

An oriented film (not shown) is formed on each of the overcoat layer 12 and an opposed substrate 31. The oriented film surface is rubbed.

The glass substrate 1 and the opposed substrate 31 are disposed in a manner that their oriented films face to each other, forming a space in which a liquid-crystal layer 40 is provided. Polarizing plates are formed on the outer faces of the glass substrate 1 and the opposed substrate 31.

In the TFT liquid-crystal display as described above, when no electric fields are applied to the liquid-crystal layer 40, the liquid-crystal molecules in the liquid-crystal layer 40 are oriented to the direction as indicated by a solid line. That is, the liquid-crystal molecules are oriented such that the longitudinal (optical axis) direction of the liquid-crystal molecules forms an angle of at least 45° to less than 90° to the direction of the electric field generated between the pixel electrode 14 and the common electrode 3. The dielectric anisotropy of the liquid-crystal molecules herein is positive. The mutually facing glass substrate 1 and opposed substrate 31 are parallel to the liquid-crystal molecules.

On turning on the thin film transistor (TFT) by applying a voltage to the gate electrode 2, a voltage is applied to the source electrode 7 and then an electric field is induced between the pixel electrode 14 and the opposed common electrode 3. The electric field aligns the longitudinal axis of the liquid-crystal molecules to a direction parallel to the electric field generated between the pixel electrode 14 and the common electrode 3 (a dotted line in the plan view).

The polarized-light transmitting axis of the polarizing plate 551 may be set at a given angle to change a light transmittance.

A process for manufacturing a liquid-crystal display according to Embodiment 1 as described above will be described with reference to FIGS. 2(a)–2(e).

A procedure for FIG. 2(a) will be described. On a glass substrate 1 is deposited a Cr film, which is then patterned by a known technique such as photolithography and etching to form a gate electrode 2. On the electrode is formed a gate insulating film 4 made of silicon nitride, via which a semiconductor film 5 made of amorphous silicon is formed on the gate electrode 2. The semiconductor film 5 may be formed by depositing amorphous silicon on the gate insulating film 4 and then patterning it by a known photolithography or etching. Then, over a part of the pattern of the semiconductor film 5 are formed a drain electrode 6 made of molybdenum and a source electrode 7, and then a protective film 8 is formed covering the whole surface. Then, a shield 11 is formed on a given part of the protective film 8. The color filter 10 may be made of, for example, a resin film containing a red, green or blue dye and may be prepared by, for example, the procedure below. First, a pigment-dispersed resist is prepared, where a pigment is dispersed in a negative type of acrylate-based photosensitive resin. It is applied to the protective film 8 to form a resist film. It is exposed to a light using a photomask to selectively irradiate a given area in the resist film, specifically a matrix form of pixel area. After the exposure, it is developed with a given developing solution to give a desired pattern. The procedure may be repeated for the desired number of colors; for example, three times for three colors, to provide a color filter 10. The shield 11 may be made of a resin film containing a black dye or pigment., or made of a metal.

Figure 2A:
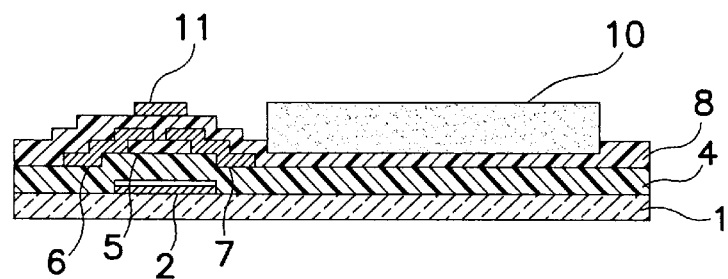
FIGS. 2(a)–2(e) illustrate a process for manufacturing the liquid-crystal display according to Embodiment 1.

FIG. 2(a) shows a product after the above procedure.

Figure 2B:
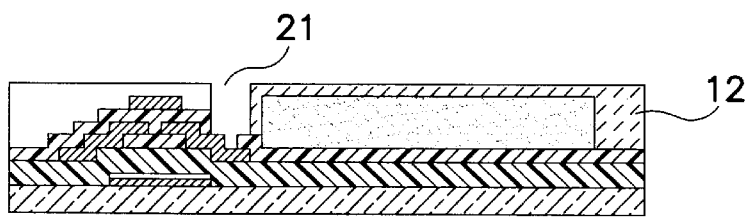

As illustrated in FIG. 2(b), on the color filter 10 and the shield 11 is formed an overcoat layer 12 made of a transparent insulating material, in a given area of which is then formed a contact hole 21 connecting to a source electrode 7. The overcoat layer 12 may be made of a thermosetting resin such as an acrylic resin or made of a transparent photocurable resin.

Figure 2C:
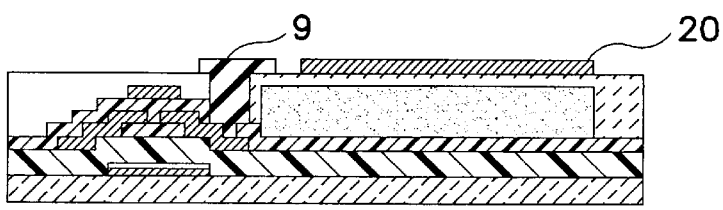

Then, as illustrated in FIG. 2(c), after forming an ITO film over the whole surface, the surface is patterned by etching to form a contact plug 9 and a shield electrode 20. The ITO film is formed such that it fills the contact hole 21 and the film thickness over the overcoat layer 12 becomes, for example, 50 to 100 nm.

Figure 2D:
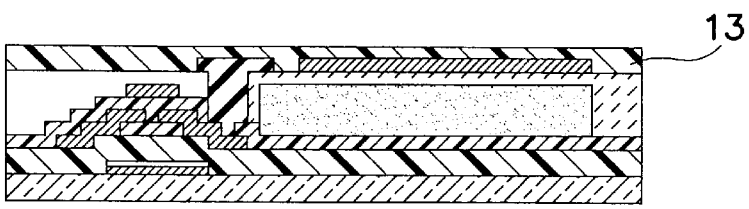

Then, over the whole surface is formed an interlayer film 13 with a thickness of 0.5 µm (FIG. 2(d)). By forming the interlayer film 13, flatness of the TFT substrate surface is improved.

Figure 2E:
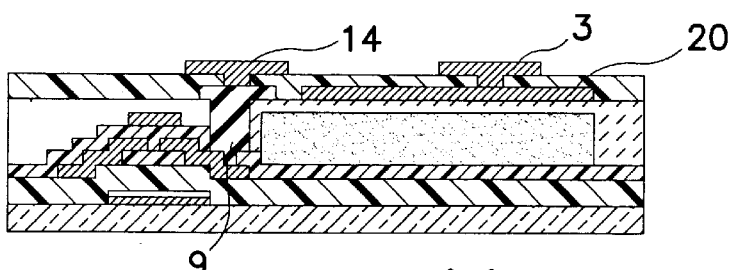

After forming holes connecting to the contact plug 9 and the shield electrode 20, respectively, a conducting film is formed over the whole surface and then is patterned by etching to form a pixel electrode 14 and a common electrode 3 (FIG. 2(e)). The conducting film may be made of a metal such as Mo and Cr or a transparent conducting material such as ITO.

After an oriented film is formed and rubbed, for example, a liquid-crystal layer 40 is formed to provide a liquid-crystal display shown in FIG. 1(b).

In the liquid-crystal display of this embodiment shown in FIG. 1(b), an electric field is generated between the pixel electrode 14 on the color filter 10 and the opposed common electrode 3 to drive the liquid-crystal molecules 41 thereabove. In this liquid-crystal display, on the glass substrate 1 are sequentially deposited the color filter 10, the pixel electrode 14 and the common electrode 3, and the liquid-crystal layer 40. There are formed the interlayer film 13 and the overcoat film 12 between the color filter 10 and the pixel and the common electrodes 14, 3, and further, a conductive shield electrode 20 made of ITO is formed. Such a structure may prevent an electric field generated between the pixel electrode 14 and the common electrode 3 from causing charging in the color filter 10. In particular, the shield electrode 20 can effectively shield an electric field generated between the pixel electrode 14 and the common electrode 3, and therefore, may effectively prevent the electric field from causing charging in the color filter 10. When a certain amount of charge is accumulated in the color filter 10, the shield electrode 20 between the color filter 10 and the liquid-crystal layer 40 can minimize effects of the charge on the liquid-crystal layer 40.

In this embodiment, one pixel has one pair of, but not limited to, common and pixel electrodes. That is, one pixel region may have appropriate numbers of common and pixel electrodes, respectively. For example, these electrodes may be formed in an arch shape where these face to each other. Such a configuration may allow the distance between the pixel and the common electrodes to be reduced even when one pixel is relatively larger, to reduce an applied voltage for driving the liquid-crystal. Although a liquid-crystal having a positive dielectric anisotropy is used in this embodiment, a liquid-crystal having a negative dielectric anisotropy may be used and similarly effective.

Embodiment 2

Figure 3A:
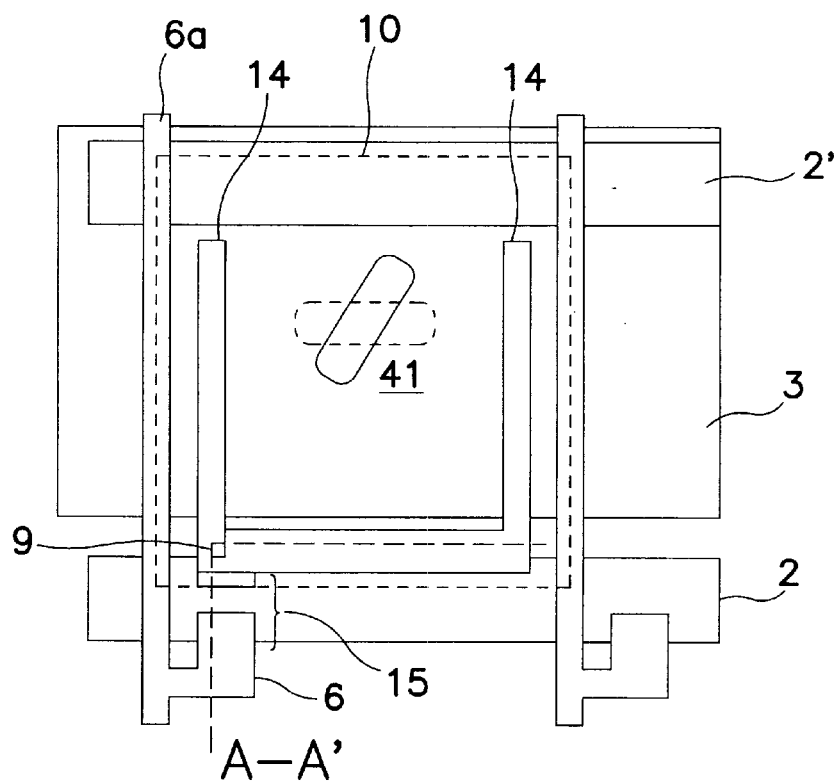
FIGS. 3(a) and 3(b) show a plan view and a cross sectional view illustrating the configuration of a liquid-crystal display according to Embodiment 2 of this invention.
Figure 3B:
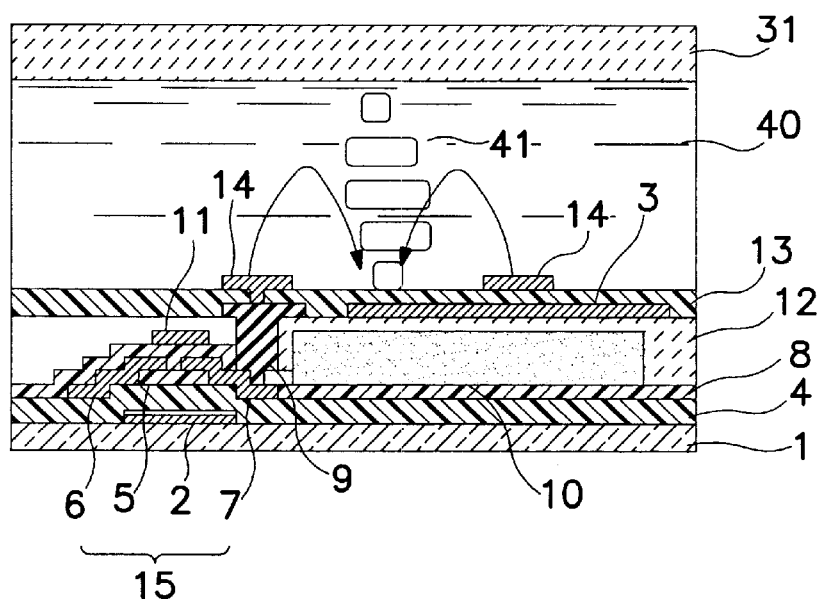

In this embodiment, a common electrode is formed under a pixel electrode and covers a color filter. In other words, the common electrode also plays a role of a shield electrode 20 in Embodiment 1. This embodiment will be described with reference to FIGS. 3(a)–3(b), where FIG. 3(b) is a cross section taken on line A–A' in FIG. 3(a).

In the liquid-crystal display of this embodiment, a gate electrode (scanning signal electrode) 2 made of Cr and a gate insulating film 4 made of silicon nitride covering the gate electrode 2 are formed on a glass substrate 1.

On the gate electrode 2, there is formed a semiconductor film 5 made of amorphous silicon acting as an active layer for a thin layer transistor (TFT), via the gate insulating film 4. A drain electrode 6 made of molybdenum and a source electrode 7 are superposed on a part of the pattern of the semiconductor film 5, and a protective film 8 made of silicon nitride is formed over all of the elements. As shown in FIG. 3(a), the drain electrode 6 is connected to a data line (an image signal electrode) 6a. In other words, the drain electrode 6 is formed as a part of the data line 6a.

On the glass substrate 1, a color filter 10 is formed via a protective film 8 and on the color filter, there are sequentially deposited an overcoat layer 12, a common electrode 3 and an interlayer film 13. While a shield electrode 20 covers the color filter 10 as illustrated in FIG. 1(b) in Embodiment 1, the common electrode 3 in this embodiment is formed instead the shield electrode 20. In this embodiment, viewing the display from the top side as illustrated in FIG. 3(a), the common electrode 3 covers at least 75% of the color filter area and at least 90% of the electrode-pair region (the region surrounded by a pixel electrode). The area of the color filter 10 is indicated with a dotted line in FIG. 3(a).

On the interlayer film 13, a pair of pixel electrodes 14 are separately formed. One of the pixel electrodes 14 is connected to the source electrode 7 via a contact plug 9. The molecular axis of liquid-crystal molecules 41 in a liquid-crystal layer 40 is controlled by an electric field generated between the pixel electrodes 14 and the common electrode 3. The area surrounded by the pixel electrodes 14 and the common electrode 3 constitutes one pixel pair. Although two pixel electrodes 14 are formed in one pixel in this embodiment, three or more pixel electrodes may be formed.

An oriented film (not shown) is formed on each of the overcoat layer 12 and an opposed substrate 31. The oriented film surface is rubbed.

The glass substrate 1 and the opposed substrate 31 are disposed in a manner that their oriented films face to each other, forming a space in which a liquid-crystal layer 40 is provided. Polarizing plates are formed on the outer faces of the glass substrate 1 and the opposed substrate 31.

In the TFT liquid-crystal display as described above, when no electric fields are applied to the liquid-crystal layer 40, the liquid-crystal molecules in the liquid-crystal layer 40 are oriented to the direction as indicated by a solid line. That is, the liquid-crystal molecules are oriented such that the longitudinal (optical axis) direction of the liquid-crystal molecules forms an angle of at least 45° to less than 90° to the direction of the electric field generated between the pixel electrodes 14 and the common electrode 3. The dielectric anisotropy of the liquid-crystal molecules herein is positive. The mutually facing glass substrate 1 and opposed substrate 31 are parallel to the liquid-crystal molecules.

On turning on the thin film transistor (TFT) by applying a voltage to the gate electrode 2, a voltage is applied to the source electrode 7 and then an electric field is induced between the pixel electrodes 14 and the opposed common electrode 3. The electric field aligns the longitudinal axis of the liquid-crystal molecules to a direction parallel to the electric field generated between the pixel electrode 14 and the common electrode 3 (a dotted line in the plan view).

The polarized-light transmitting axis of the polarizing plate 551 may be set at a given angle to change a light transmittance.

As described above, in this embodiment, an electric field is generated between the pixel electrodes 14 on the color filter 10 and the opposed common electrode 3 as shown in FIG. 3 to drive the liquid-crystal molecules 41 thereabove.

In this embodiment, above the color filter 10 are formed the pixel electrodes 14 and the common electrode 3 over which is formed a liquid-crystal layer 40. There are formed the interlayer layer 13, the overcoat film 12 and the common electrode 3 between the color filter 10 and the pixel electrodes 14. Such a structure may prevent an electric field generated between the pixel electrodes 14 and the common electrode 3 from causing charging in the color filter 10. In particular, the common electrode 3 covering the color filter 10 can effectively shield an electric field generated between the pixel electrodes 14 and the common electrode 3, and therefore, may effectively prevent the electric field from causing charging in the color filter 10. The common electrode 3 between the color filter 10 and the liquid-crystal layer 40 can reduce effects of accumulated charge in the color filter 10 on the liquid-crystal layer 40. Since the pixel electrodes 14, the common electrode 3 and the common electrode interconnection 3a are connected to different layers via an overcoat layer 2 in this embodiment, it may allow the area of the common electrode 3 to be increased while preventing it from being in contact with the pixel electrodes 14. Such a structure allows the common electrode 3 to cover at least 70% of the color filter 10 or at least 90% of the color filter 10 within the electrode-pair region.

In addition, since the common electrode 3 and the pixel electrodes 14 are piled up via the interlayer film 13, the region plays a role of a storage capacity, to improve the layout efficiency of the device, which is advantageous for, e.g., achieving a higher definition.

In this embodiment, one pixel has one common electrode and two pixel electrodes, but this invention is not limited to the configuration. That is, one pixel region may have appropriate numbers of common and pixel electrodes, respectively. For example, these electrodes may be formed in an arch shape where these face to each other. Such a configuration may allow the distance between the pixel and the common electrodes to be reduced even when one pixel is relatively larger, to reduce an applied voltage for driving the liquid-crystal. Although a liquid-crystal having a positive dielectric anisotropy is used in this embodiment, a liquid-crystal having a negative dielectric anisotropy may be used and similarly effective.

Embodiment 3

Figure 4A:
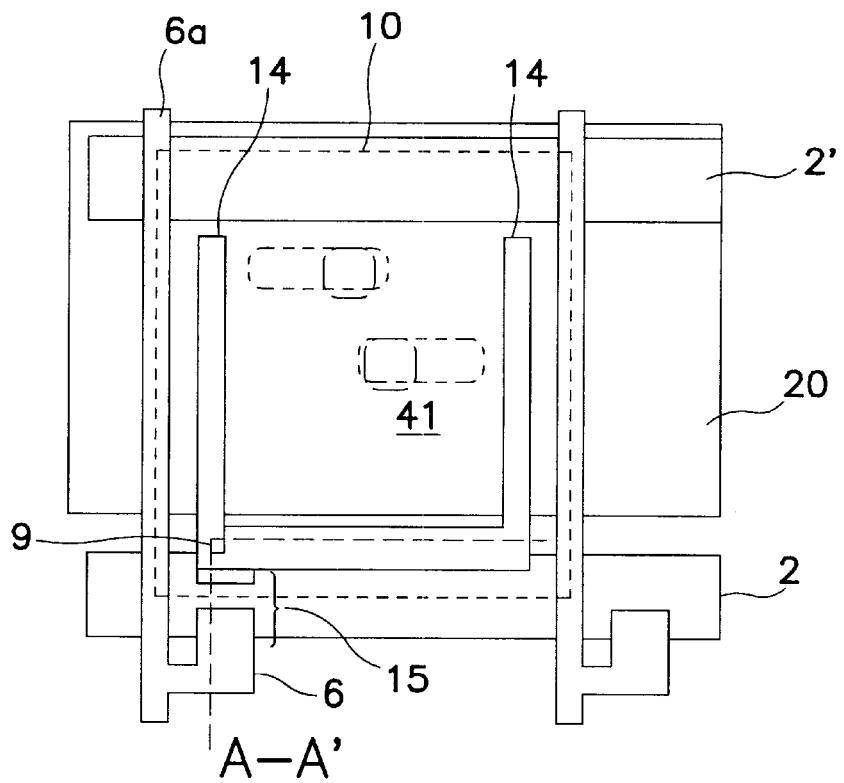
FIGS. 4(a) and 4(b) show a plan view and a cross sectional view illustrating the configuration of a liquid-crystal display according to Embodiment 3 of this invention.
Figure 4B:
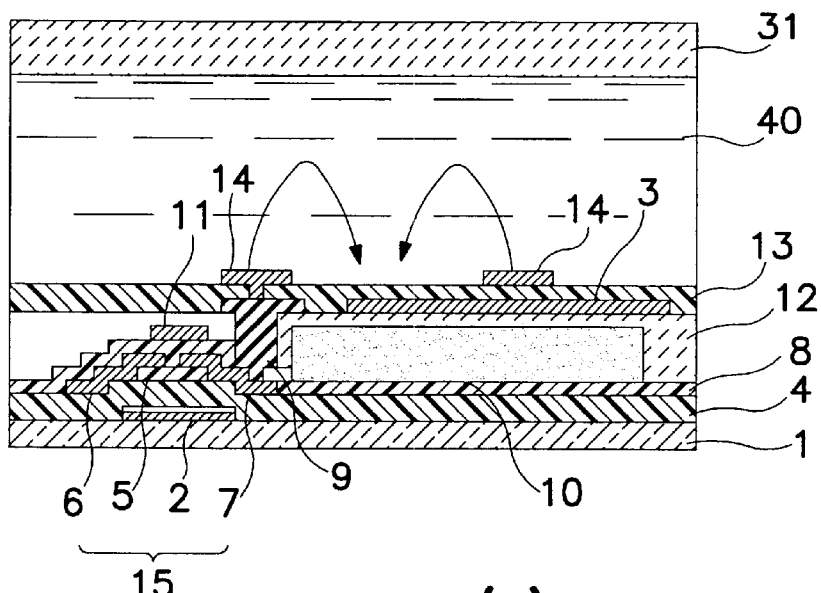
Figure 5A:
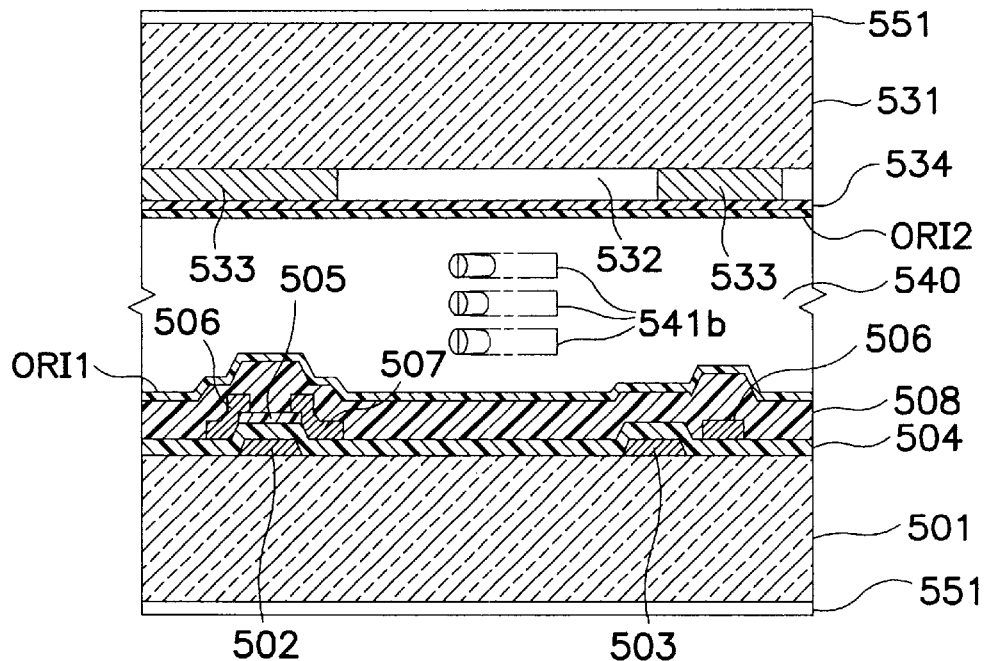
FIGS. 5(a) and 5(b) illustrate the configuration of an IPS type of liquid-crystal display according to the prior art, wherein a color filter is formed on an opposed substrate.
Figure 5B:
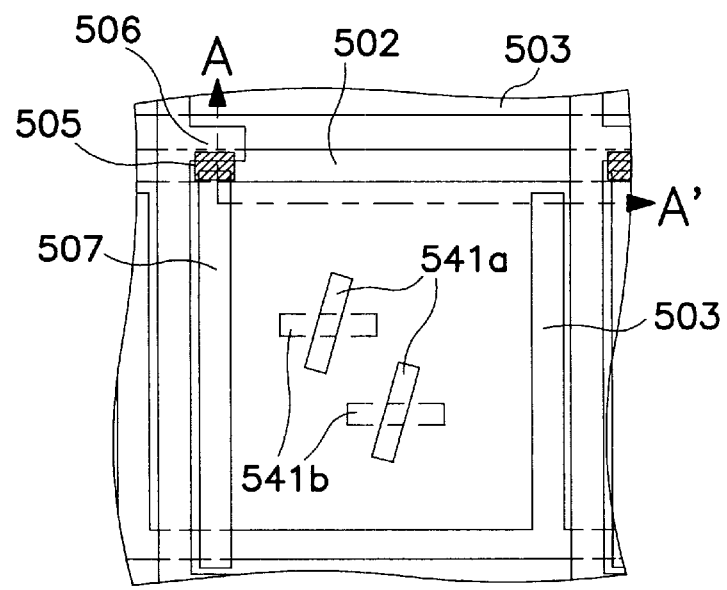

A display according to this embodiment has a structure as described in Embodiment 2, except a liquid-crystal layer 40 and an oriented film. The liquid-crystal display of this embodiment will be described with reference to FIGS. 4(a) and 4(b).

In this embodiment, a vertical oriented film is formed on a surface of an active matrix substrate where unit pixels as described in Embodiment 2 are arranged in a matrix form, i.e., on an interlayer film 13 on which a pixel electrode is formed. The oriented film has been rubbed or light-oriented as necessary.

On the other hand, on an opposed substrate 31 is also formed a vertical oriented film, whose surface has been rubbed or light-oriented as necessary. A glass substrate 1 and the opposed substrate 31 are disposed in a manner that their oriented films face to each other, forming a space in which a liquid-crystal layer 40 is provided.

When no electric fields are applied to the liquid-crystal layer, the liquid-crystal molecules 41 are oriented to a direction substantially vertical to the substrate (a solid line in the plan view). A dielectric anisotropy of the liquid-crystal was positive. On turning on the thin film transistor (TFT) by applying a voltage to the gate electrode, a voltage is applied to the source electrode and then an electric field is induced between the pixel electrode and the opposed common electrode, during which the liquid-crystal molecules are tilted to be substantially parallel to the electric field, i.e., to the substrate (a dotted line in the plan view). Furthermore, since the electric field is not precisely parallel to the substrate, the liquid-crystal molecules between the electrodes have two different tilting directions.

Thus, although the liquid-crystal display of this embodiment allows the liquid-crystal molecules to be automatically tilted without any special treatment to the oriented film and therefore to achieve a wider angle of visibility, any treatment may be conducted for more precisely controlling the tilting angle of the liquid-crystal molecules, such as applying to the oriented film rubbing which will be divided by photolithography or using a light-oriented film as an oriented film to which an oblique polarized or non-polarized light is irradiated depending on the properties of the oriented film. In addition, a small amount of monomer may be introduced for preventing the orientation of the liquid crystal from being disturbed by transverse electric fields from a gate line and a drain line during driving, and the monomer may be polymerized to memorize the proper orientation.

Fixing the polarized-light transmission axis of a polarizing plate at a given angle, a light transmittance may be varied, depending on movement of the above liquid-crystal molecules.

Although the mode is normally black when the polarized-light transmission axes are orthogonal, compensatory films for a negative and a positive single axes may be combined to reduce dependency of an initial retardation of the liquid-crystal orientation to an observation-angle. It may effectively reduce observation-angle dependency of a black state to improve image quality and achieve a wider angle of visibility.

As described above, this embodiment may minimize the state that an unwanted electric field remains between the top and the bottom of the liquid-crystal layer. The display properties are, therefore, more durable than those of the structure according to the prior art. Furthermore, the structure where the liquid-crystal molecules oriented to substantially vertical to the substrate are tilted to the substrate direction by an applied electric field, can achieve a wider angle of visibility without coloring when observing from an oblique direction, than the structure of the prior art where the liquid-crystal molecules rotate within a plane parallel to the substrate.

In this embodiment, charging in the color filter 10 may be also prevented to effectively reduce effects of accumulated charge in the color filter 10 on the liquid-crystal layer 40. Although a liquid-crystal having a positive dielectric anisotropy is used in this embodiment, a liquid-crystal having a negative dielectric anisotropy may be similarly effective.

As described above, a liquid-crystal display according to this invention has a structure that both pixel and common electrodes for controlling liquid crystal are formed above a color filter and that the color filter is covered by a shield or common electrode. Such a structure can protect the color filter from an electric field generated between interconnections, particularly between the pixel and the common electrodes, and can effectively prevent the color filter from being charged by the electrode. In addition, the shield or common electrode between the color filter and the liquid-crystal layer can reduce effects of accumulated charge in the color filter on the liquid-crystal layer to improve display properties of the liquid-crystal display.

This application is based on Japanese patent application NO.HEI11-099150, the content of which is incorporated hereinto by reference.

What is claimed is:

1. A liquid-crystal display comprising a first and a second substrate, and a liquid-crystal layer between the substrates, wherein a pixel consisting of a pixel electrode and a common electrode in a matrix form, and a switching element for controlling operation of the pixel are formed on a liquid-crystal-layer side of the first substrate, a color filter and a shield electrode covering the color filter are formed on the first substrate, and the pixel electrode and the common electrode are formed on the shield electrode.

2. A liquid-crystal display as claimed in claim 1 where a voltage applied between the common and the pixel electrodes generates an electric field dominantly comprising a component parallel to the first substrate.

3. A liquid-crystal display as claimed in claim 1 where liquid-crystal molecules in the liquid-crystal layer are oriented in a direction substantially parallel to the first substrate when any voltage is not applied between the common and the pixel electrodes.

4. A liquid-crystal display as claimed in claim 1 where liquid-crystal molecules in the liquid-crystal layer are oriented in a direction substantially vertical to the first substrate when any voltage is not applied between the common and the pixel electrodes.

5. A liquid-crystal display comprising a first and a second substrate, and a liquid-crystal layer between the substrates, wherein a pixel consisting of a pixel electrode and a common electrode in a matrix form, and a switching element for controlling operation of the pixel are formed on a liquid-crystal-layer side of the first substrate, a color filter is formed on the first substrate, the common electrode is formed covering the color filter, and the pixel electrode is formed over the common electrode.

6. A liquid-crystal display as claimed in claim 5 where a voltage applied between the common and the pixel electrodes generates an electric field dominantly comprising a component parallel to the first substrate.

7. A liquid-crystal display as claimed in claim 5 where liquid-crystal molecules in the liquid-crystal layer are oriented in a direction substantially parallel to the first substrate when any voltage is not applied between the common and the pixel electrodes.

8. A liquid-crystal display as claimed in claim 5 where liquid-crystal molecules in the liquid-crystal layer are oriented in a direction substantially vertical to the first substrate when any voltage is not applied between the common and the pixel electrodes.

* * * * *